US010069567B2

(12) United States Patent
Nakagawa

(10) Patent No.: US 10,069,567 B2
(45) Date of Patent: Sep. 4, 2018

(54) OPTICAL COMMUNICATION SYSTEM, OPTICAL RECEIVER AND OPTICAL TRANSMITTER

(71) Applicant: FUJITSU LIMITED, Kawasaki-shi, Kanagawa (JP)

(72) Inventor: Goji Nakagawa, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/225,501

(22) Filed: Aug. 1, 2016

(65) Prior Publication Data

US 2017/0041075 A1 Feb. 9, 2017

(30) Foreign Application Priority Data

Aug. 4, 2015 (JP) ................................ 2015-154406

(51) Int. Cl.
*H04B 10/25* (2013.01)
*H04B 10/079* (2013.01)
*H04B 10/27* (2013.01)
*H04L 27/02* (2006.01)
*H04L 27/10* (2006.01)

(52) U.S. Cl.
CPC ... *H04B 10/2504* (2013.01); *H04B 10/07953* (2013.01); *H04B 10/27* (2013.01); *H04L 27/10* (2013.01)

(58) Field of Classification Search
None
See application file for complete search history.

(56) References Cited

U.S. PATENT DOCUMENTS 6,433,864 B1 8/2002 Chung et al.
2008/0279556 A1* 11/2008 Yu ...................... H04B 10/2587 398/72

(Continued)

FOREIGN PATENT DOCUMENTS

JP 2014-179936 9/2014
JP 2014-179954 9/2014

OTHER PUBLICATIONS

S. Oda et al., "In-band OSNR Monitor Using an Optical Bandpass Filter and Optical Power Measurements for Superchannel Signals," ECOC, P.3.12, London (2013) (3 pages).

*Primary Examiner* — Shi K Li
*Assistant Examiner* — Mina Shalaby
(74) *Attorney, Agent, or Firm* — Fujitsu Patent Center

(57) ABSTRACT

An optical receiver receives signal light obtained by superimposing a second signal to a first signal according to a predetermined superimposition pattern. In the optical receiver, a tunable optical filter allows a part of a spectrum of the received light to pass, and a photodetector converts the transmission light into an electrical signal. A filter controller controls a center transmittance frequency of the tunable optical filter in response to a superimposed period and a non-superimposed period of the second signal identified based on the electrical signal. A superimposed signal detector detects the second signal based on the electrical signal obtained in response to the control of the tunable optical filter during the superimposed period. An optical signal-to-noise ratio (OSNR) calculator calculates an OSNR of the signal light based on the electrical signal obtained in response to the control of the tunable optical filter during the non-superimposed period.

10 Claims, 11 Drawing Sheets

(56) References Cited

U.S. PATENT DOCUMENTS

| | | | | |
|---|---|---|---|---|
| 2009/0304395 | A1* | 12/2009 | Hong | H04B 10/5055 398/189 |
| 2013/0188956 | A1* | 7/2013 | Abe | H04B 10/50 398/79 |
| 2014/0010543 | A1* | 1/2014 | Lee | H04B 10/61 398/79 |
| 2014/0270756 | A1 | 9/2014 | Oda et al. | |
| 2014/0270781 | A1 | 9/2014 | Nakagawa et al. | |

* cited by examiner 10
11
DSP
exp(2πjΔft m(t))
111
112
113
Path ID
Main signal
Δft:Frequency deviation
12
DAC
LD
DAC
122I
121
122Q
123I
123Q
IQ mod.
124
OPTICAL TRANSMISSION LINE
30
31
Optical BPF
32
PD
33
Path ID detector
w/o FSK
with FSK
Q
I
100
Power
FM
λ
with FSK
301
Transmittance
302
Converted to AM
303

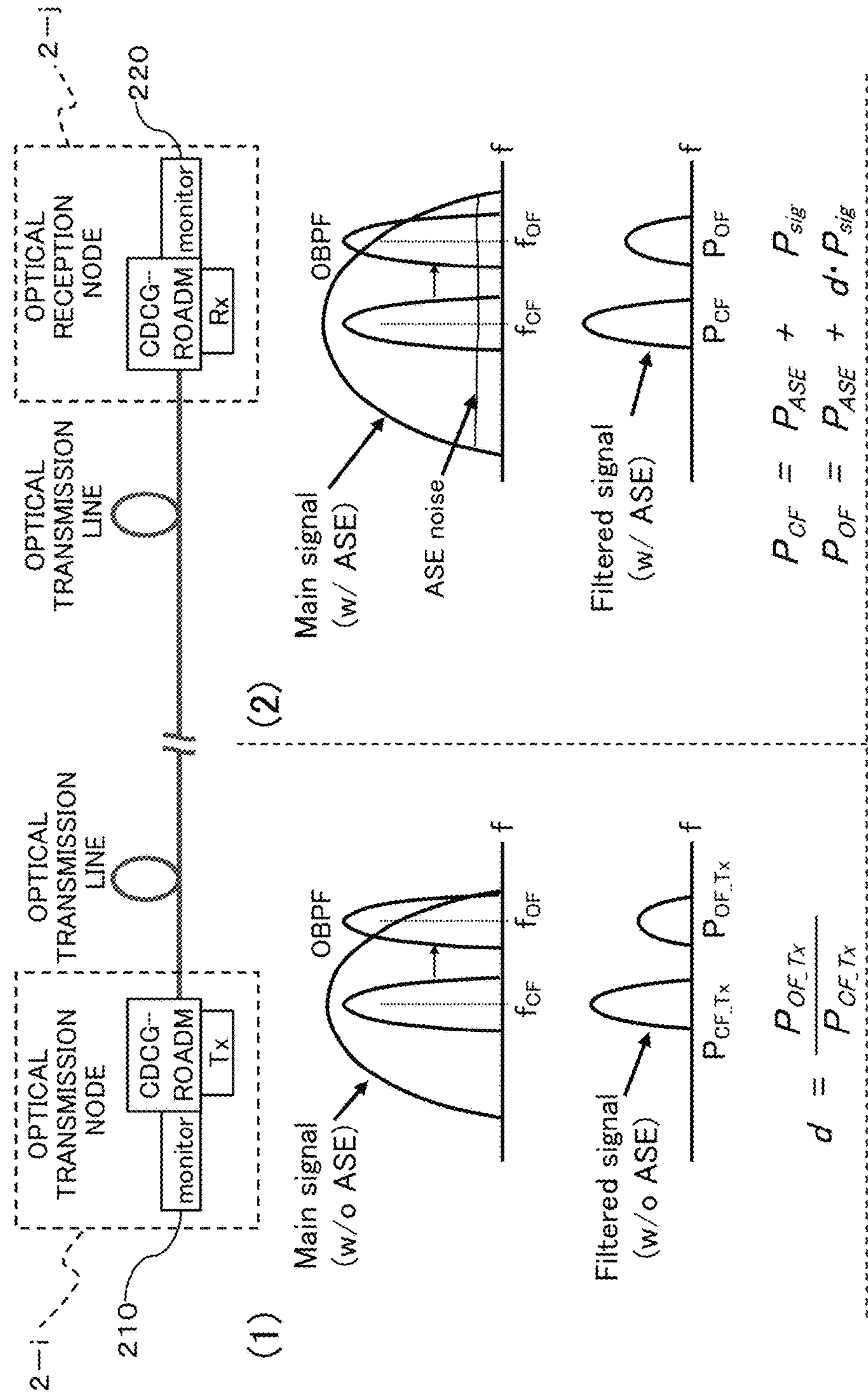

FIG. 4
2—i
210
OPTICAL TRANSMISSION NODE
monitor
CDCG-ROADM
Tx
OPTICAL TRANSMISSION LINE
OPTICAL TRANSMISSION LINE
OPTICAL RECEPTION NODE
CDCG-ROADM
Rx
monitor
220
2—j
(1)
Main signal (w/o ASE)
OBPF
$f_{CF}$
$f_{OF}$
f
Filtered signal (w/o ASE)
$P_{CF\_Tx}$
$P_{OF\_Tx}$
f
$d = \frac{P_{OF\_Tx}}{P_{CF\_Tx}}$
(2)
Main signal (w/ ASE)
ASE noise
OBPF
$f_{CF}$
$f_{OF}$
f
Filtered signal (w/ ASE)
$P_{CF}$
$P_{OF}$
f
$P_{CF} = P_{ASE} + P_{sig}$
$P_{OF} = P_{ASE} + d \cdot P_{sig}$ 30
RECEIVED SIGNAL LIGHT
TUNABLE OPTICAL FILTER
51
PD
52
FILTER CONTROL
SIGNAL PROCESSOR
OPTICAL POWER DETECTOR
5311
LIGHT LABEL DETECTOR
5312
OSNR CALCULATOR
5313
SYNCHRONIZATION DETECTOR
5314
531
FILTER CONTROLLER
533
STORAGE
532
CONTROLLER
53

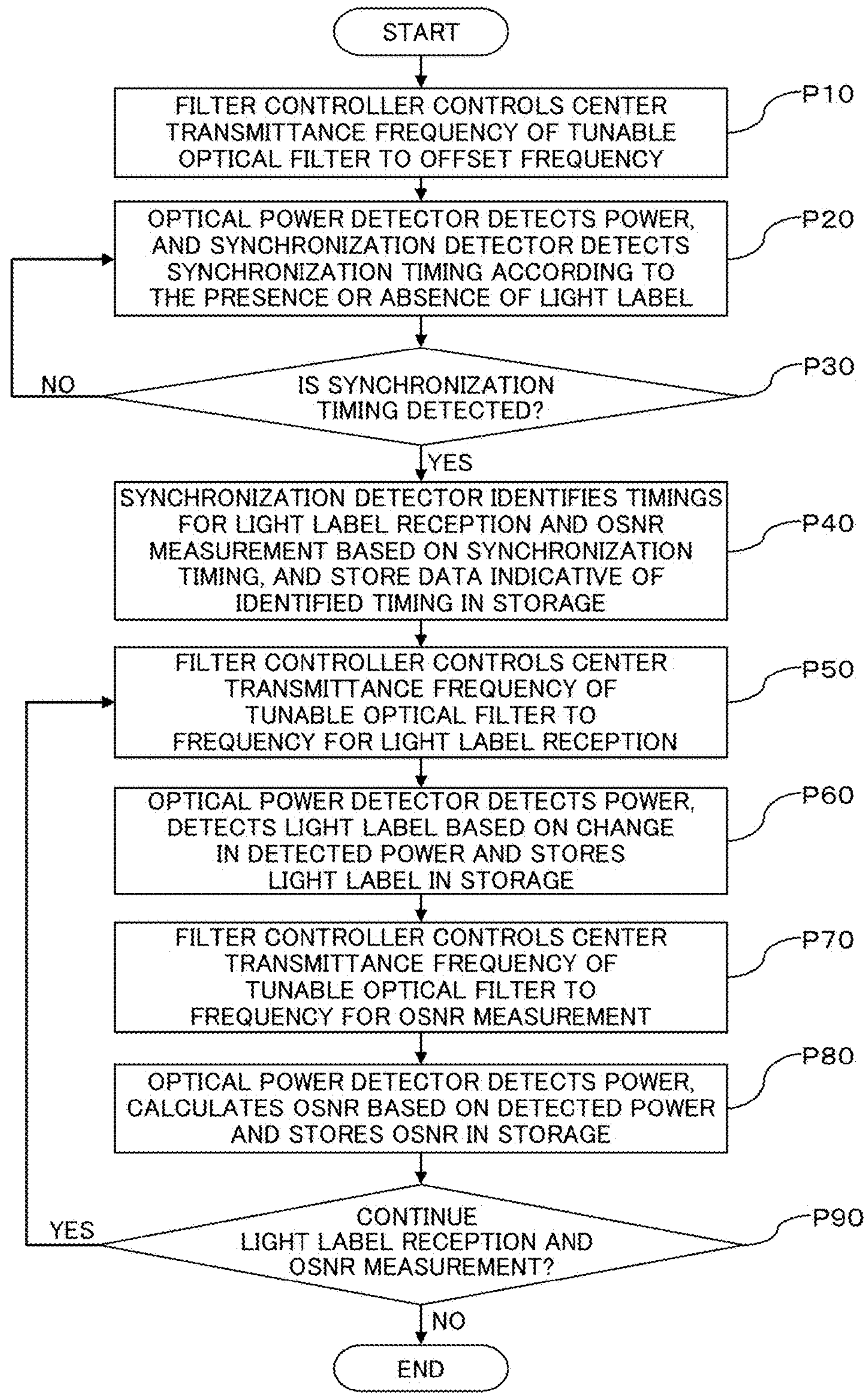
FIG. 10
START
FILTER CONTROLLER CONTROLS CENTER TRANSMITTANCE FREQUENCY OF TUNABLE OPTICAL FILTER TO OFFSET FREQUENCY
P10
OPTICAL POWER DETECTOR DETECTS POWER, AND SYNCHRONIZATION DETECTOR DETECTS SYNCHRONIZATION TIMING ACCORDING TO THE PRESENCE OR ABSENCE OF LIGHT LABEL
P20
IS SYNCHRONIZATION TIMING DETECTED?
P30
NO
YES
SYNCHRONIZATION DETECTOR IDENTIFIES TIMINGS FOR LIGHT LABEL RECEPTION AND OSNR MEASUREMENT BASED ON SYNCHRONIZATION TIMING, AND STORE DATA INDICATIVE OF IDENTIFIED TIMING IN STORAGE
P40
FILTER CONTROLLER CONTROLS CENTER TRANSMITTANCE FREQUENCY OF TUNABLE OPTICAL FILTER TO FREQUENCY FOR LIGHT LABEL RECEPTION
P50
OPTICAL POWER DETECTOR DETECTS POWER, DETECTS LIGHT LABEL BASED ON CHANGE IN DETECTED POWER AND STORES LIGHT LABEL IN STORAGE
P60
FILTER CONTROLLER CONTROLS CENTER TRANSMITTANCE FREQUENCY OF TUNABLE OPTICAL FILTER TO FREQUENCY FOR OSNR MEASUREMENT
P70
OPTICAL POWER DETECTOR DETECTS POWER, CALCULATES OSNR BASED ON DETECTED POWER AND STORES OSNR IN STORAGE
P80
CONTINUE LIGHT LABEL RECEPTION AND OSNR MEASUREMENT?
P90
YES
NO
END PREAMBLE | PAYLOAD | CHECKSUM
FIG. 11A
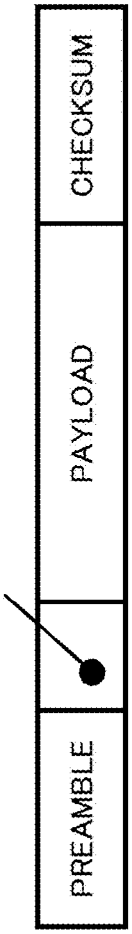
FIG. 11B
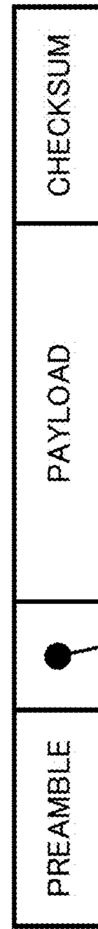
FIG. 11C

OPTICAL COMMUNICATION SYSTEM, OPTICAL RECEIVER AND OPTICAL TRANSMITTER

CROSS-REFERENCE TO RELATED APPLICATION

This application is based upon and claims the benefit of priority of the prior Japanese Patent Application No. 2015-154406, filed on Aug. 4, 2015, the entire contents of which are incorporated herein by reference.

FIELD

The embodiment discussed herein is related to an optical communication system, an optical receiver and an optical transmitter.

BACKGROUND

In one of optical communication techniques, a signal different from a main signal may be superimposed to main signal light. For example, a signal related to a monitor or a control of an optical communication system may be superimposed to main signal light with a frequency shift keying (FSK).

LIST OF RELATED ART DOCUMENTS

Patent Document 1: JP 2014-179954 A
Patent Document 2: JP 2014-179936 A
Patent Document 3: U.S. Pat. No. 6,433,864 B1
Non-Patent Document 1: S. Oda et al., "In-band OSNR Monitor Using an Optical Bandpass Filter and Optical Power Measurements for Superchannel Signals," ECOC, P.3.12, London (2013)

When a signal different from a main signal is superimposed to main signal light, fluctuations due to the superimposed signal may occur in the main signal light. Hence, a measurement accuracy of an optical signal-to-noise ratio (OSNR) may be deteriorated, for example. The OSNR is an example of a reception quality indicator (which may be referred to as reception characteristics) of signal light.

SUMMARY

According to one aspect, an optical communication system may include an optical transmitter, and an optical receiver configured to receive signal light transmitted by the optical transmitter. The optical transmitter may include a drive signal generator and an optical modulator. The drive signal generator may be configured to generate a drive signal by selectively superimposing a second signal to a first signal to be transmitted, according to a predetermined superposition pattern including a superimposed period in which the second signal is superimposed and a non-superimposed period in which the second signal is not superimposed. The optical modulator may be configured to modulate transmission light with the drive signal generated by the drive signal generator to generate the signal light. Meanwhile, the optical receiver may include a tunable optical filter, a photodetector, a filter controller, a superimposed signal detector and an optical signal-to-noise ratio calculator. The tunable optical filter may be configured to allow a part of spectrum of the received signal light to pass through. The photodetector may be configured to convert light having passed through the tunable optical filter into an electrical signal. The filter controller may be configured to control a center transmittance frequency of the tunable optical filter in response to the superimposed period and the non-superimposed period of the second signal identified based on the electrical signal. The superimposed signal detector may be configured to detect the second signal based on the electrical signal obtained in response to the control of the center transmittance frequency of the tunable optical filter during the superimposed period. The optical signal-to-noise ratio calculator may be configured to calculate an optical signal-to-noise ratio of the signal light based on the electrical signal obtained in response to the control of the center transmittance frequency of the tunable optical filter during the non-superimposed period.

Further, according to one aspect, an optical receiver may include a tunable optical filter, a photodetector, a filter controller, a superimposed signal detector and an optical signal-to-noise ratio calculator. The tunable optical filter may be configured to receive signal light which is obtained by superimposing a second signal to a first signal to be transmitted according to a predetermined superposition pattern including a superimposed period in which the second signal is superimposed and a non-superimposed period in which the second signal is not superimposed, and allow a part of a spectrum of the signal light to pass through. The photodetector may be configured to convert light having passed through the tunable optical filter into an electrical signal. The filter controller may be configured to control a center transmittance frequency of the tunable optical filter in response to the superimposed period and the non-superimposed period of the second signal identified based on the electrical signal. The superimposed signal detector may be configured to detect the second signal based on the electrical signal obtained in response to the control of the center transmittance frequency of the tunable optical filter during the superimposed period. The optical signal-to-noise ratio calculator may be configured to calculate an optical signal-to-noise ratio of the signal light based on the electrical signal obtained in response to the control of the center transmittance frequency of the tunable optical filter during the non-superimposed period.

Further, according to one aspect, an optical transmitter may include a drive signal generator and an optical modulator. The drive signal generator may be configured to generate a drive signal by selectively superimposing a second signal to a first signal to be transmitted, according to a predetermined superposition pattern including a superimposed period in which the second signal is superimposed and a non-superimposed period in which the second signal is not superimposed. The optical modulator may be configured to modulate transmission light with the drive signal generated by the drive signal generator to generate the signal light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a block diagram illustrating an example of an optical signal-to-noise ratio (OSNR) monitor using an optical filter;

FIG. 10 is a flowchart illustrating an operation example of the optical receiver illustrated in FIG. 9; and FIGS. 11A to 11C are diagrams illustrating format examples of FSK signals to be superimposed to a main signal.

DESCRIPTION OF EMBODIMENTS

Figure 1:
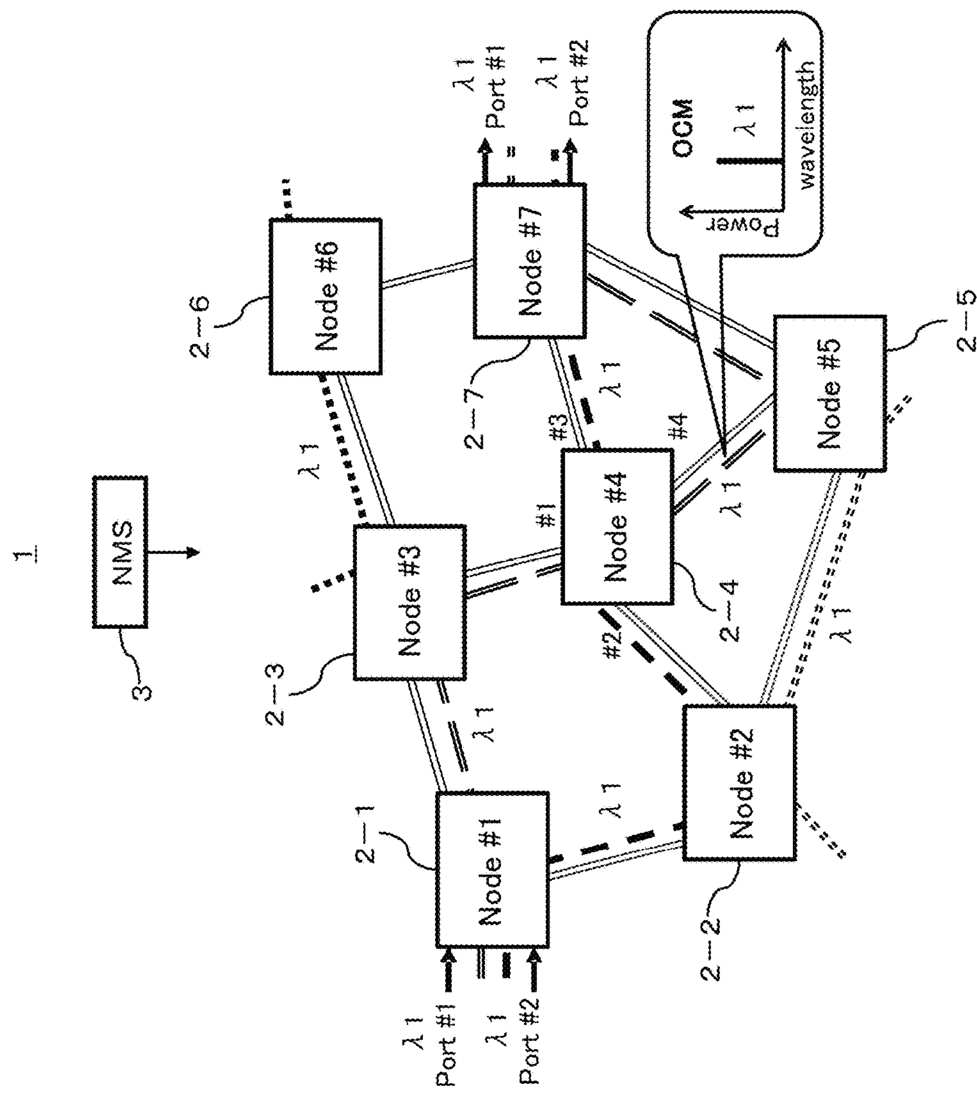
FIG. 1 is a block diagram illustrating a configuration example of an optical communication system according to an embodiment.

Hereinafter, an embodiment will be described with reference to the drawings. However, the embodiment described below is only illustrative and does not intend to exclude application of various modifications and technologies that are not explicitly described below. Further, various exemplary aspects described below may be optionally combined and carried out. In addition, components assigned the same reference numeral in the drawings used for the following embodiment will represent identical or same components unless otherwise specified.

FIG. 1 is a block diagram illustrating a configuration example of an optical communication system according to an embodiment. The "optical communication system" may be referred to as a "photonic network". An optical communication system 1 illustrated in FIG. 1 may include, for example, a plurality of optical transmission apparatuses 2-1 to 2-N (#1 to #N) (N is an integer equal to or more than two).

The "optical transmission apparatus" may be referred to as a "node" or a "station". A node 2-*i* (i is any one of 1 to N) will be also abbreviated simply as a "node 2" when the each of nodes 2-*i* does not need to be distinguished each other.

The nodes 2 may be optical-communicably connected with optical transmission lines. Each optical transmission line may be a transmission line of an optical fiber. Optical communications through each optical transmission line may be uni-directional communications or bi-directional communications.

Any one or more of nodes 2 may be a WDM node available to transmit WDM light or a ROADM available to drop and add signal light for each wavelength. Further, each node 2 may be a WXC available to switch degrees of signal light for each wavelength.

The "wavelength" may be referred to as a "channel". The "wavelength" included in WDM light may be referred to as a "subchannel" or a "subcarrier" for the purpose of descriptions.

The "WDM" is an abbreviation of "Wavelength Division Multiplex". The "ROADM" is an abbreviation of "Reconfigurable Optical Add/Drop Multiplexer".

The "WXC" is an abbreviation of "wavelength cross connect". The "WXC" may be referred to as a "photonic cross connect (PXC)".

The ROADM 2 may be a "CDCG-ROADM". The "CDCG" is an abbreviation of "color-less, direction-less, contention-less and grid-less".

The "CDCG" means that the CDCG-ROADM 2 is free from (in other words, no limitations in) a wavelength dependency, a degree dependency, a wavelength collision and a wavelength interval or a band in a setting of a wavelength path between the nodes 2. Further, the term "Reconfigurable" means that the CDCG-ROADM 2 is available to be flexibly changed in a configuration thereof.

Thus, the CDCG-ROADM 2 is available to flexibly set a path in response to a connection request from a user (may also be referred to as an "operator"). Therefore, it is possible to improve a data rate and/or an efficiency of network operation, and to reduce operational cost.

The photonic network 1 (also simply referred to as the "network 1" below) in which the CDCG-ROADM 2 is applied to each node 2-*i* enables a free setting in optical paths, and allows to allocate the same wavelength to a plurality of different optical paths.

In an example in FIG. 1, spans other than a span between a node #6 and a node #7 are set with optical paths of the same wavelengths λ1. The "optical path" may also be referred to as a "wavelength path".

Since the free setting of optical path is allowed, it becomes important to monitor the optical path. An optical channel monitor (OCM) is applicable to a monitor of the optical path. For example, one or more of the OCMs may be provided in each node 2.

However, each OCM is merely possible to monitor optical power of a wavelength. Therefore, the OCM is not available to identify different optical paths allocated with the same wavelengths.

Hence, it is difficult to monitor, for example, optical paths allocated to different optical fiber transmission lines with the same wavelengths. The monitoring of an optical path may also be referred to as a "wavelength path trace".

An example of a method to enable a wavelength path trace for different optical paths allocated with the same wavelengths is a method to superimpose information available to identify an optical path to main signal light. The information available to identify an optical path may be referred to as a "path identifier (ID)" or may be referred to as a "light label".

A signal indicative of a path ID may be referred to as a "wavelength path trace signal" or simply referred to as a "path trace signal". The "path trace signal" may be considered as an example of a signal available to check a connectivity (or reachability) of an optical path. The "path trace signal" may also be referred to as a "superimposed signal" or a "sub-signal" of a main signal.

The "superimposed signal" or the "sub-signal" may be considered as an example of a "supervisory (SV) signal". A signal (or information) available to be superimposed to signal light is not limited to a path trace signal. Some signals or information pieces different from a main signal may be superimposed to signal light. A frequency shift keying (FSK) is applicable for superimposing other signals and/or information pieces to a main signal.

Figure 2:
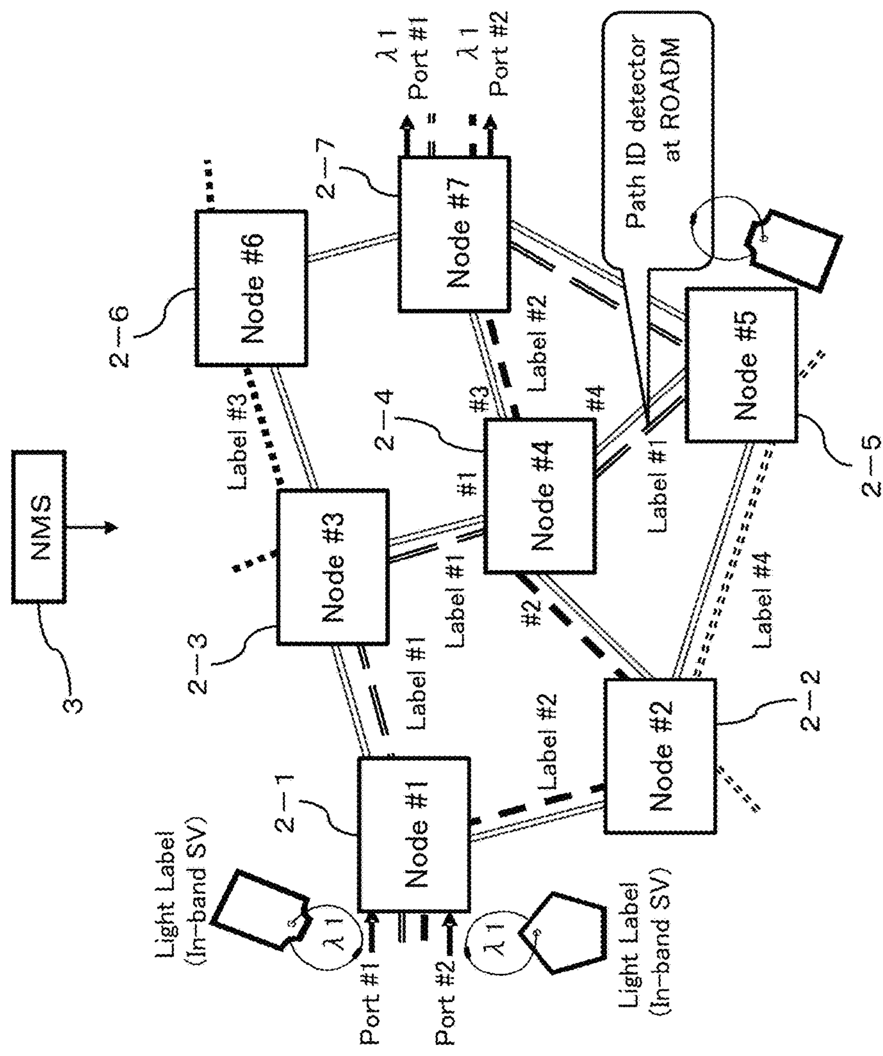
FIG. 2 is a block diagram illustrating an example of a wavelength path tracing technique of the optical communication system illustrated in FIG. 1.

For example, as illustrated in FIG. 2, a first light label #1 may be superimposed to main signal light propagated in an optical path, which is allocated with the wavelength λ1 and passes through nodes #1, #3, #4, #5 and #7. Further, a second light label #2 may be superimposed to main signal light propagated in an optical path, which is allocated with the wavelength λ1 and passes through nodes #1, #2, #4 and #7.

Furthermore, a third light label #3 may be superimposed to main signal light propagated in an optical path, which is allocated with the wavelength λ1 and passes through nodes #3 to #6. A fourth light label #4 may be superimposed to main signal light propagated in an optical path, which is allocated with the wavelength λ1 and passes through nodes #2 to #5.

The above superimposing of a light label to main signal light to be transmitted enables each node 2 to detect a light label by detecting signal component superimposed to the main signal light. Thus, each node 2 is not necessary to convert the whole received main signal light into an electrical signal and to terminate the electrical signal for a detection of the light label.

The setting of an optical path and a light label may be performed by a network management system (NMS) 3 that is available to centralizedly manage and control the whole operation of the network 1, for example. The NMS 3 may also be referred to as an operation system (OPS) 3.

Figure 3:
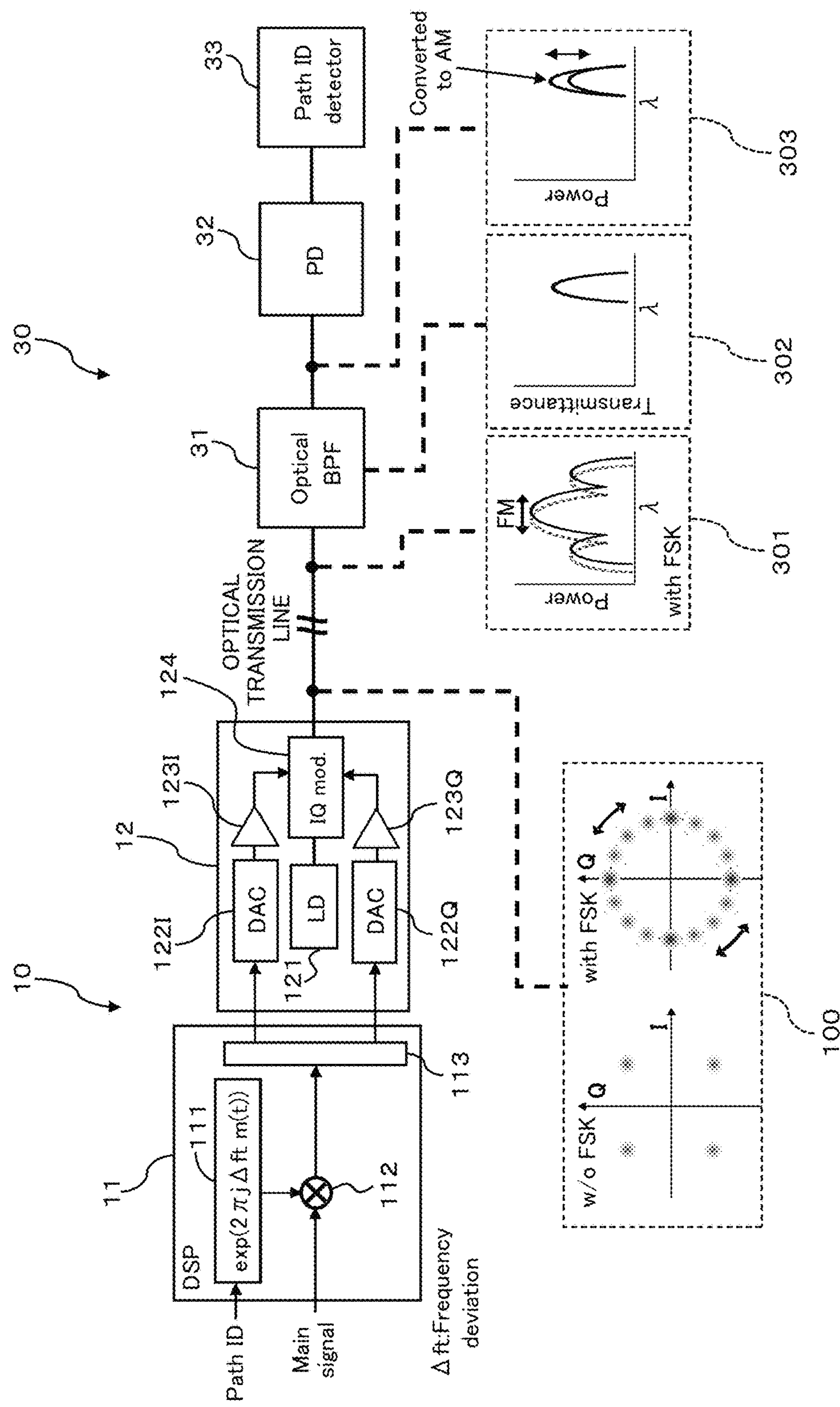
FIG. 3 is a block diagram illustrating a configuration example of an optical transmitter available to superimpose a light label to main signal light.

FIG. 3 illustrates a configuration example an optical transmitter and an optical receiver according to the embodiment. An optical transmitter 10 illustrated in FIG. 3 is available to superimpose a light label to main signal light, and an optical receiver 30 is available to detect the light label superimposed to the main signal light.

The optical transmitter 10 may include, for example, a digital signal processor (DSP) 11, and an optical transmission module 12.

The digital signal processor 11 may superimpose a path ID to main signal data with performing a digital signal process. A path ID may be superimposed to the main signal data by controlling a carrier frequency of the main signal light based on the path ID.

For example, the carrier frequency of the main signal light can be controlled by rotating a constellation of the main signal on a complex plane (IQ plane) as indicated by a dotted line frame 100 in FIG. 3. A rotation speed of the constellation of the main signal may correspond to a frequency shift in the FSK.

A digital main signal data to which the path ID is superimposed with the FSK may be used for a drive signal of an optical modulator 124 in the optical transmission module 12.

For example, the digital main signal data is demultiplexed into an in-phase component (I component) and a quadrature component (Q component) on the complex plane by the digital signal processor 11 to be input to a digital-analog converters (DAC) 122I and 122Q provided in the optical transmission module 12. The demultiplexing of the I component and the Q component from the digital main signal data may be performed by an IQ demultiplexer 113 with a digital signal process.

For example, the DAC 122I may process the I component signal of the digital main signal data, and the other DAC 122Q may process the Q component signal of the digital main signal data.

The DAC 122I converts a digital I component signal into an analog I component signal, and the DAC 122Q converts a digital Q component signal into a Q analog component signal.

The analog I component signal and the analog Q component signal are amplified by driver amplifiers 123I and 123Q to drive signals having applicable amplitudes to drive the optical modulator 124, and are supplied to drive electrodes (not illustrated) provided in the optical modulator 124.

Hence, the DSP 11 may be considered as an example of a drive signal generator which generates a drive signal of the optical modulator 124.

The optical modulator 124 modulates output light of a light source 121 with drive signals supplied from the driver amplifiers 123I and 123Q. Thereby, modulated signal light in which a path ID is superimposed as an FSK signal to main signal light is obtained. The optical modulator 124 may be referred to as an "IQ modulator 124".

In this regard, s(t) represents an electrical field of the main signal light, and Δft represents a maximum frequency shift of an FSK signal which is superimposed to the main signal light. Further, a waveform of the FSK signal is represented by a time function m(t) which takes a value in a range of "−1 to +1" according to a temporal change.

In this case, main signal light s'(t) to which an FSK signal is superimposed can be expressed by Mathematical Formula 1 set out below.

$$s'(t)=s(t)\exp(2\pi j\Delta ft\cdot m(t)) \quad \text{[Mathematical Formula 1]}$$

An arithmetic operation of Mathematical Formula 1 may be realized by a frequency controller 111 and a phase rotator 112 that are implemented by a digital signal process of the DSP 11. The frequency controller 111 may be also referred to as a "phase rotation controller 111". The phase rotator 112 may be a multiplier.

The phase rotation controller 111 performs an arithmetic operation corresponding to "exp(2πjΔft·m(t)" in Mathematical Formula 1 to supply to the phase rotator 112 a phase rotation amount of main signal data, which corresponds to the path ID". The phase rotator 112 performs an FSK on the main signal data by multiplying the main signal data with the supplied phase rotation amount.

The "main signal data" may be referred to simply as a "main signal". A main signal is an example of a first signal transmitted by the optical transmitter 10. A signal to be superimposed to the main signal is an example of a second signal.

The second signal may be periodically superimposed to the first signal as described below. In other words, the first signal may include a period in which the second signal is superimposed and a period in which the second signal is not superimposed.

A frequency of an FSK signal, in other words, a frequency of the "m(t)" may be sufficiently lower than a carrier frequency of the main signal light. For example, a frequency order of the FSK signal may be at a kilohertz (kHz) order while the carrier frequency is at a gigahertz (GHz) order.

Meanwhile, as illustrated in FIG. 3, the optical receiver 30 may include, for example, an optical band-pass filter (OBPF) 31, a PD (photodetector or a photodiode) 32 and a path ID identification circuit 33. The path ID identification circuit 33 may also be referred to as a "path ID receiver 33" or a "path ID detector 33".

Since the FSK signal is superimposed to the main signal light which is input to the OBPF 31, a center frequency of an optical spectrum shifts between "+Δft" and "−Δft" as illustrated in a dotted line frame 301. It may be considered that the center frequency of the main signal optical spectrum corresponds to the carrier frequency of the main signal light.

In this regard, as illustrated in a dotted line frame 302, a center transmittance frequency (or a wavelength, the same is applied in the following) of the OBPF 31 may be set to a frequency offset (or shifted) to a high frequency side (or a low frequency side) with respect to the carrier frequency of the main signal light.

Further, a transmittance bandwidth of the OBPF 31 may be set to a bandwidth which allows a part of a main signal light spectrum to pass. For example, the transmittance bandwidth of the OBPF 31 may be set to a narrower bandwidth than half of a bandwidth which the main signal light spectrum occupies.

According to such setting of filter characteristics (may be referred to simply as a "filter setting"), as illustrated in a dotted line frame 303 in FIG. 3, the amount of light passing through the OBPF 31 is changed by a frequency shift corresponding to the FSK signal in the main signal light spectrum.

Hence, an optical power change corresponding to the frequency shift of the main signal light spectrum occurs in output light of the OBPF 31. In other words, the frequency shift corresponding to the FSK signal in the main signal light spectrum is converted into amplified modulation (AM) light by the OBPF 31. The "AM light" may be referred to as an "amplitude shift keying (ASK) light".

The AM light is received by the PD 32, and is converted into an electrical signal including an AM signal component corresponding to the received optical power.

The path ID identification circuit 33 is possible to detect a path ID superimposed as the FSK signal to the main signal light by identifying the AM signal component of the electrical signal.

The PD 32 may have a reception sensitivity sufficient to receive the FSK signal component having the frequency sufficiently lower than the carrier frequency of the main signal light, as described above. Hence, a high-speed PD available to satisfy a reception sensitivity for the main signal light does not need for the PD 32, and a low-speed PD may be applied to the PD 32.

As described above, the optical receiver 30 is possible to detect a path ID superimposed to the main signal light with a simple configuration in which the OBPF 31 and the low-speed PD 32 are used.

By the way, when the FSK signal is superimposed to the main signal light, fluctuations corresponding to the FSK occurs in the main signal light. Therefore, it may be difficult to monitor an optical signal-to-noise ratio (OSNR) of the main signal light accurately. The term of "monitor" may be referred to as "measure" or "detect".

Figure 5:
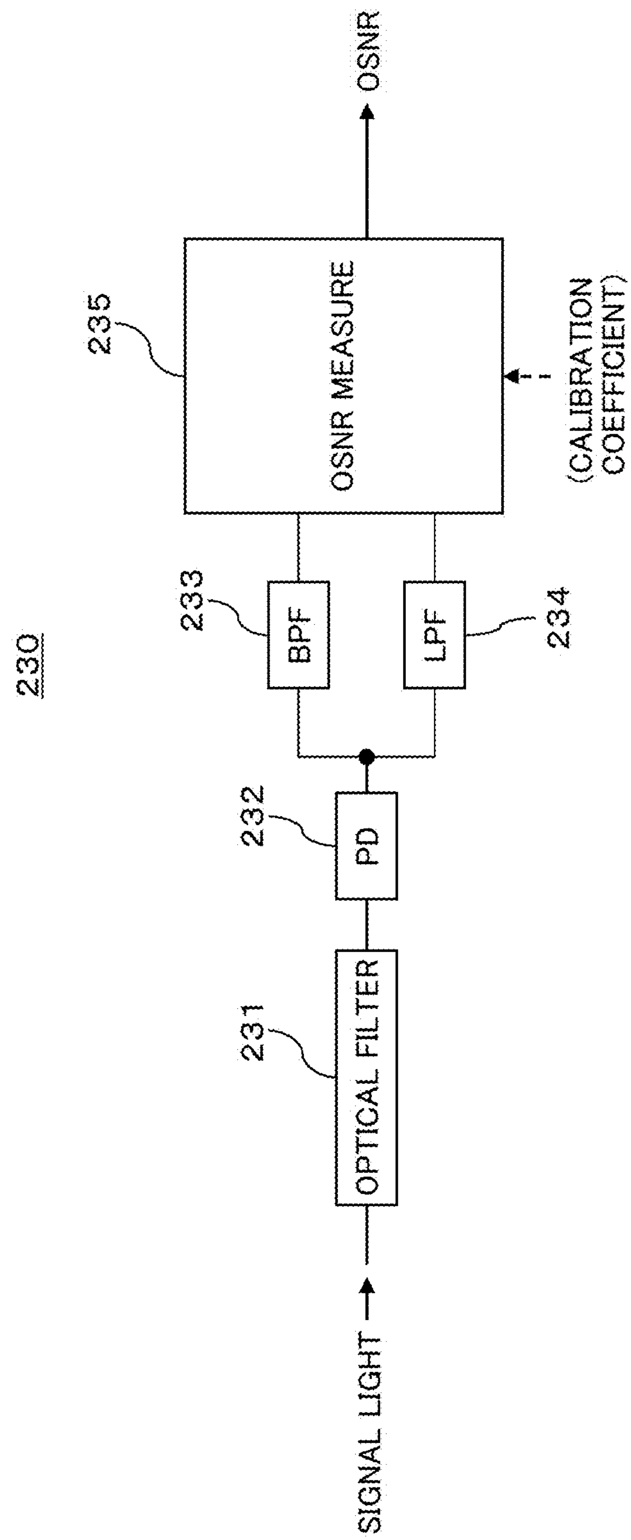
FIG. 5 is a block diagram illustrating another example of an OSNR monitor using an optical filter.

FIGS. 4 and 5 illustrate examples of an OSNR monitor which uses an optical filter. A configuration illustrated in FIG. 4 includes an optical transmission node 2-*i*, and an optical reception node 2-*j* (j is one of 1 to N and j≠i). The nodes 2-*i* and 2-*j* are connected by an optical transmission line. Each of the nodes 2-*i* and 2-*j* may be the CDCG-ROADM.

An OSNR of main signal light at the optical reception node 2-*j* can be calculated based on transmission light power of main signal light transmitted by the optical transmission node 2-*i* to the optical transmission line and received optical power of the main signal light received by the optical reception node 2-*j* from the optical transmission line.

Hence, the optical transmission node 2-*i* may include a transmission light monitor 210 which monitors optical power of a specific frequency component of the main signal light transmitted to the optical transmission line toward the optical reception node 2-*j*.

Meanwhile, the optical reception node 2-*j* may include a received light monitor 220 which monitors optical power of a specific frequency component of the main signal light received from the optical transmission line, for example.

In order to detect an optical power of the specific frequency component, an optical filter (e.g. an optical band-pass filter (OBPF)) that allows the specific frequency component of the main signal light to pass may be applied to the transmission light monitor 210 and the received light monitor 220.

The specific frequency may correspond to a center frequency $f_{CF}$ of the main signal light spectrum and a frequency $f_{OF}$ offset from the center frequency $f_{CF}$ in the frequency domain. It may be considered that the center frequency of the main signal light spectrum corresponds to the "carrier frequency". A direction of the frequency offset may be a high frequency side or a low frequency side with respect to the center frequency $f_{CF}$.

A component of the center frequency $f_{CF}$ and a component of the offset frequency $f_{OF}$ may be extracted (or detected) by using the individual OBPFs or may be extracted by using a single tunable OBPF. For example, by setting a center transmittance frequency of the tunable OBPF to the center frequency $f_{CF}$ and the offset frequency $f_{CF}$, selectively, it is possible to extract light corresponding to each of the frequency components.

For example, by inputting light having passed through the OBPF to the PD (a photodetector or a photodiode), it is possible to detect each optical power of the component with the center frequency $f_{CF}$ and the offset frequency $f_{OF}$.

In the received light monitor 220 of the optical reception node 2-*j*, a received OSNR of the main signal light can be obtained by Mathematical Formula 2 set out below.

$$OSNR[\text{dB}] = 10\log_{10}\left(\alpha\frac{P_{sig}}{P_{ASE}}\right) = 10\log_{10}\left(\alpha\frac{1-R}{Rd-1}\right) \quad \text{[Mathematical Formula 2]}$$

In Mathematical Formula 2, "α" represents a proportionality coefficient, and "R" can be calculated by Mathematical Formula 3 set out below. "D" in Mathematical Formula 2 represents a calibration coefficient.

$$R = \frac{P_{CF}}{P_{OF}} \quad \text{[Mathematical Formula 3]}$$

In Mathematical Formula 3, "$P_{CF}$" represents an optical power of a component with the center frequency $f_{CF}$ of the received main signal light, and "$P_{OF}$" represents an optical power of a component with the offset frequency $f_{OF}$ of the received main signal light. The $P_{CF}$ and the $P_{CF}$ may be measured by received light monitor 220. For example, the $P_{CF}$ and the $P_{OF}$ can be calculated by Mathematical Formula 4 set out below.

$$P_{CF}=P_{ASE}+P_{sig}$$

$$P_{OF}=P_{ASE}+dP_{sig} \quad \text{[Mathematical Formula 4]}$$

In Mathematical Formulae 2 and 4, "$P_{sig}$" represents an optical power of a component of the main signal light in the received light, and "$P_{ASE}$" represents an optical power of a component of an amplified spontaneous emission (ASE) light included in the received light. Further, the calibration coefficient "d" in Mathematical Formulae 2 and 4 can be calculated by Mathematical Formula 5 set out below.

$$d = \frac{P_{OF\_Tx}}{P_{CF\_Tx}} \quad \text{[Mathematical Formula 5]}$$

In Mathematical Formula 5, "$P_{CF\_Tx}$" represents an optical power of a component with the center frequency $f_{CF}$ of transmission main signal light, and "$P_{OF\_Tx}$" represents an optical power of a component with the offset frequency $f_{OF}$ of the transmission main signal light. "$P_{CF\_Tx}$" and "$P_{OF\_Tx}$" may be calculated by the transmission light monitor 210.

As schematically illustrated in (1) in FIG. 4, the transmission light monitor 210 may time-divisionally set the center transmittance frequency of the OBPF to the center frequency $f_{CF}$ and the offset frequency $f_{OF}$ of the transmission main signal light.

Thus, light components with the center frequency $f_{CF}$ and the offset frequency $f_{OF}$ having passed through the OBPF are time-divisionally input to the PD. Thereby, the $P_{CF\_Tx}$ and the $P_{OF\_Tx}$ can be detected time-divisionally. By assigning the detected $P_{CF\_Tx}$ and $P_{OF\_Tx}$ to Mathematical Formula 5, the calibration coefficient "d" can be calculated.

The calculated calibration coefficient d may be illustratively notified to the received light monitor 220. The calibration coefficient "d" may be notified to the received light monitor 220 via the NMS 3 or by superimposing the calibration coefficient "d" as an FSK signal to main signal light to be transmitted to the optical reception node 2-*j*.

It may be understood that the transmission main signal light does not include a component of the ASE noise. Hence, it may also be understood that light having passed through the OBPF in the transmission light monitor 210 does not include a component of the ASE noise.

Meanwhile, similar in the transmission light monitor 210, as schematically illustrated in (2) in FIG. 4, the received light monitor 220 may time-divisionally set the center transmittance frequency of the OBPF to the center frequency $f_{CF}$ and the offset frequency $f_{CF}$ of the main signal light.

Thus, light components with the $f_{CF}$ and the $f_{OF}$ having passed through the OBPF are time-divisionally input to the PD. Thereby, the $P_{CF}$ and the $P_{OF}$ are detected time-divisionally. By assigning the detected $P_{CF}$ and $P_{OF}$ to Mathematical Formula 3, "R" in Mathematical Formula 2 can be calculated. Further, by assigning the calculated "R" and the calibration coefficient "d" calculated by Mathematical Formula 5 to Mathematical Formula 1, the OSNR of the received signal light can be calculated.

Meanwhile, an OSNR monitor 230 illustrated in FIG. 5 may include, for example, an optical filter 231, a PD 232, a band-pass filter (BPF) 233, a low pass filter (LPF) 234 and an OSNR measure 235.

The optical filter 231 may be an OBPF, and has the center transmittance frequency set to a center frequency of received signal light spectrum to allow a specific wavelength component of the main signal light to pass to the PD 232.

Figure 6:
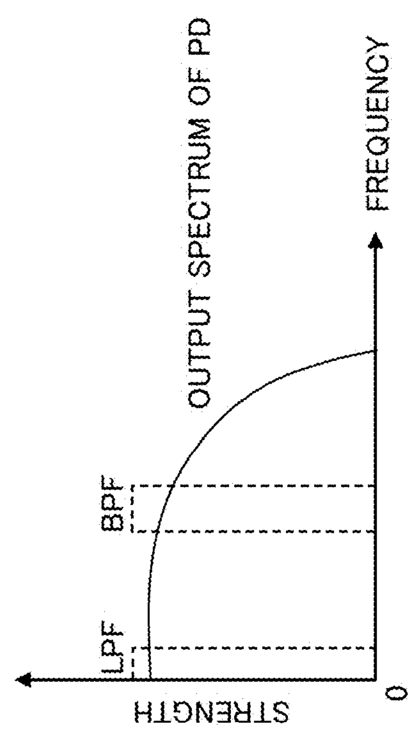
FIG. 6 is a diagram illustrating an example of an output spectrum of a PD (a photodetector or a photodiode) illustrated in FIG. 5.

The PD 232 inputs to the BPF 233 and the LPF 234 an electrical signal corresponding to received optical power of the received main signal light having passed through the optical filter 231. FIG. 6 illustrates an example of an output spectrum of the PD 232.

As indicated by dotted lines in FIG. 6, the LPF 234 allows a direct current (DC) component of an output spectrum of the PD 232 to pass, and the BPF 233 allows an alternating current (AC) component of an output spectrum of the PD 232 to pass.

The OSNR measure 235 measures an OSNR based on a relationship between power of the DC component having passed through the LPF 234 and power of the AC component having passed through the BPF 233. The OSNR measure 235 may use a calibration coefficient for a measurement of OSNR.

As described above, one of the two measuring methods illustrated in FIGS. 4 and 5 is applicable the OSNR monitor. However, according to both of the measuring methods, when an FSK signal is superimposed to the main signal light, power fluctuations (in other words, an ASK signal component) corresponding to an FSK modulation occurs in light passing through an optical filter (e.g. the OBPF). Therefore, the measurement accuracy of the OSNR may be deteriorated.

Figure 7:
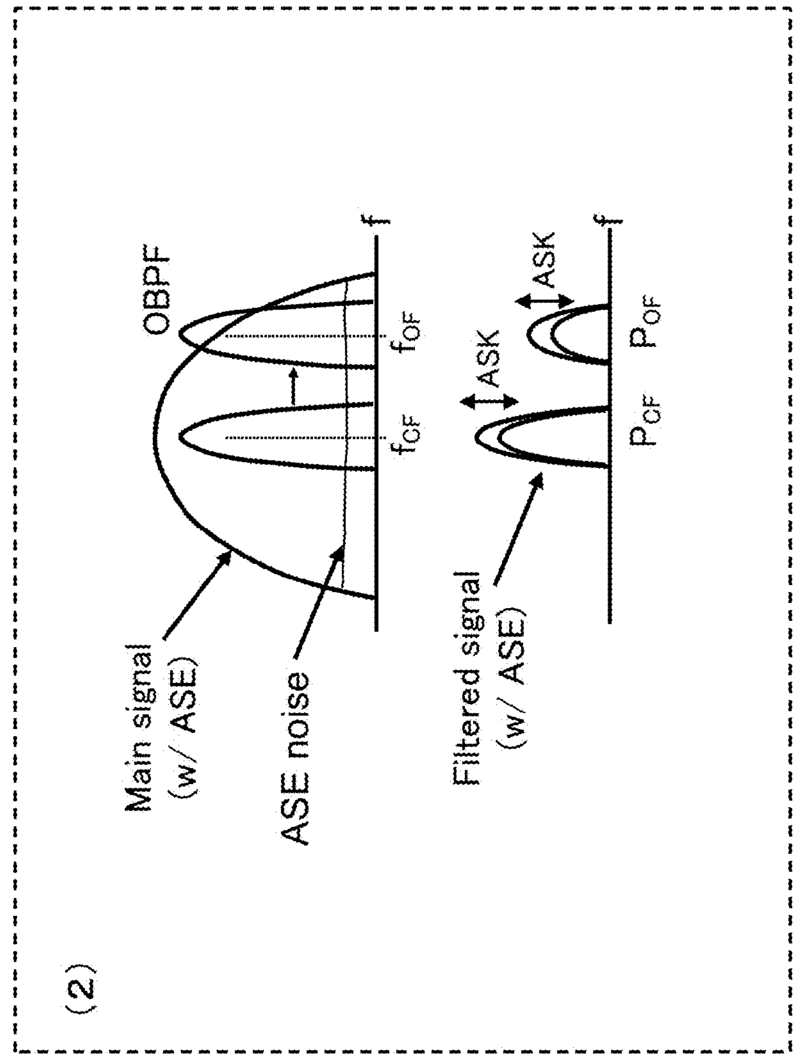
FIG. 7 is a diagram illustrating that an ASK signal component corresponding to an FSK modulation may be occurred in light having passed through the optical filter in a received light monitor illustrated in FIG. 4.

For example, according to the measuring method illustrated in FIG. 4, an ASK signal component corresponding to the FSK modulation may occur in light having passed through the OBPF in the received light monitor 220 illustrated in (2) of FIG. 4 (see FIG. 7). In this case, the optical powers $P_{CF}$ and $P_{OF}$ represented by Mathematical Formula 4 fluctuate, and therefore, an error would occur in an OSNR finally calculated according to Mathematical Formula 1.

Further, according to the measuring method illustrated in FIG. 5, since signal light passes through the optical filter 231, an FSK signal component would impact as a noise on an output spectrum of the PD 232. Therefore, an error would also occur in an OSNR calculated based on a relationship between DC component power and AC component power of the output spectrum of the PD 232.

Such a deterioration in a measurement of OSNR may occur regardless of a shared or individual use of optical parts such as optical filters for an FSK signal reception and an OSNR monitor.

For example, the OBPF used for the received light monitor 220 illustrated in FIG. 4 and the optical filter 231 illustrated in FIG. 5 may correspond to the OBPF 31 illustrated in FIG. 3, and may be shared for the FSK signal reception and the OSNR monitor, or may be dedicated to the OSNR monitor.

In order to prevent the deterioration of an accuracy in the measurement of OSNR, a method of controlling a detection timing of an FSK signal and a measurement timing of an OSNR by using a control plane (CP) signal (in other words, control signal) may be considered.

For example, the control signal causes a transmission side to temporarily stop superimposing an FSK signal to main signal light. Meanwhile, a main signal light reception side performs a reception and detection of an FSK signal during a time period in which the FSK signal is superimposed to the main signal light, and performs a measurement of an OSNR during a time period in which the superimposition of the FSK signal is stopped, according to the control signal. For example, the center transmittance frequency of the OBPF in the OSNR monitor is adjusted by the control signal to a frequency for a measurement of an OSNR.

However, for example, an optical network may be provided with tens to several hundreds of nodes, and signal light including more than 100 wavelengths may be transmitted in the optical network. In this case, when a detection timing of the FSK signal and a measurement timing of the OSNR are individually controlled for each node and each wavelength, the adjustment of the timing control (which may also be referred to as "timing synchronization") would take a long time.

For example, assuming that the number of nodes is 50, the number of wavelengths is 100 and a time taken to perform communication using a control signal is 10 ms per node, a time calculated by 10 ms*50 nodes*100 wavelengths*2 (for a transmission side and a reception side)=100 seconds would be taken for the adjustment.

However, in view of a constant monitor for a failure or an error in an optical path, a detection of the light label and/or a measurement of the OSNR may be required for real time performance, and therefore, when the adjustment takes 100 seconds, the real time performance would be impaired.

Hence, in the embodiment, a timing pattern to superimpose an FSK signal (for example, a light label) to main signal light may be set in advance in a transmission side of the main signal light. The timing pattern may also be referred to as an "FSK superimposition timing pattern" for the purpose of description.

A reception side of the main signal light is possible to autonomously identify a detection timing (or period) for the FSK signal and a measurement timing (or period) for an OSNR by detecting the FSK superimposition timing pattern.

The reception side may selectively perform a detection of an FSK signal and a measurement of an OSNR according to the identified timing (or period). Thereby, it is possible to secure both of a detection reliability of the FSK signal and an improvement of a measurement accuracy of OSNR. Further, since a communication using a control signal is not needed, it is possible to reduce a time taken for detecting a light label that is an example of the FSK signal and/or taken for measuring an OSNR.

The FSK superimposition timing pattern may have two periods that are periodically and alternately appeared in the pattern. A first period of the two periods may be a period in which an FSK signal is superimposed to main signal light. A second period of the two periods may be a period in which the FSK signal is not superimposed to the main signal light. Alternatively, the two periods may appears non-periodically in the FSK superimposition timing pattern.

According to the former periodic and alternate superimposition pattern, the reception side is possible to detect the FSK superimposition timing pattern easily. According to the latter non-periodic pattern, information available to identify this pattern at the reception side may be superimposed as an FSK signal to the main signal light.

Figure 8:
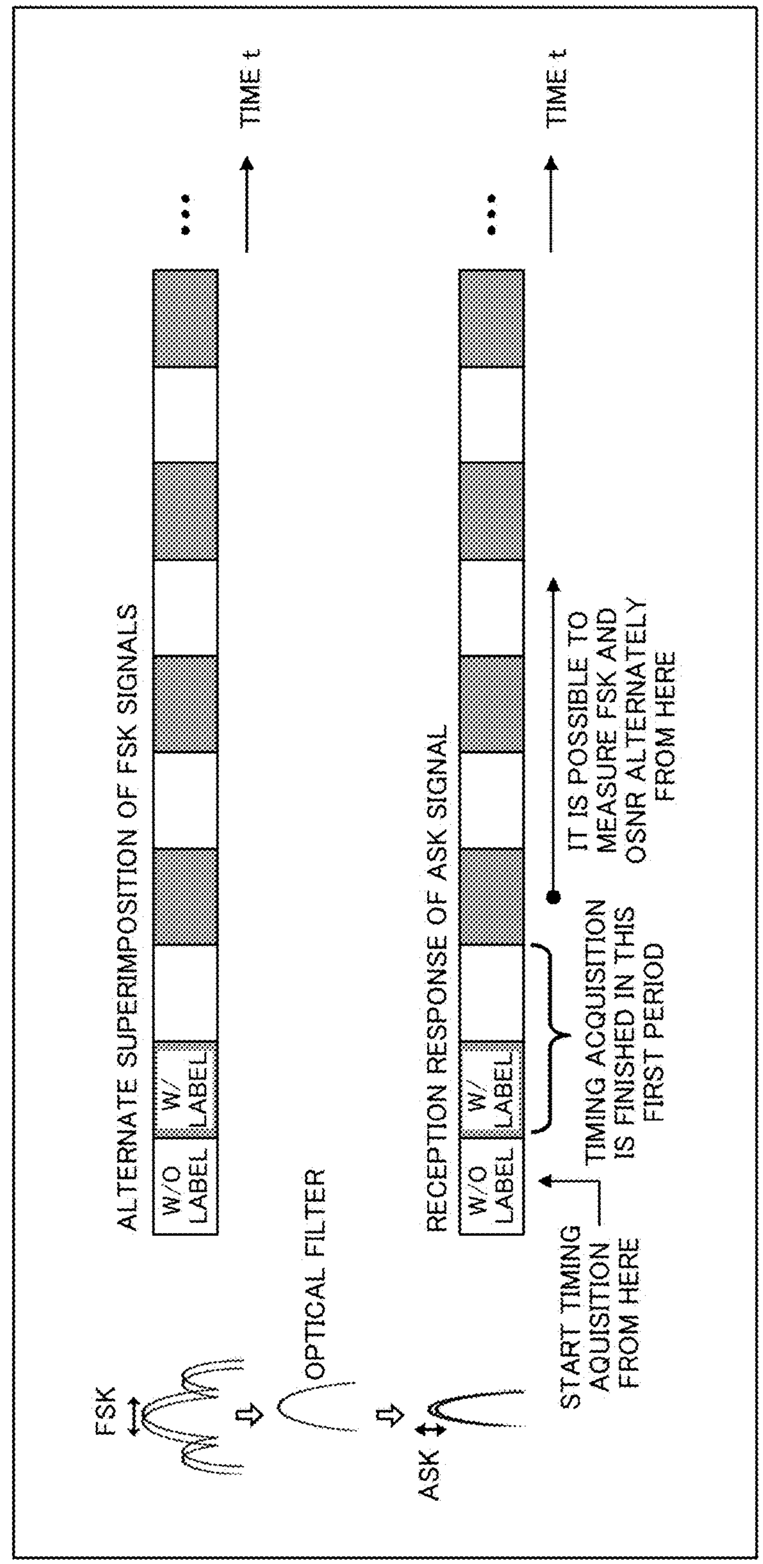
FIG. 8 is a diagram illustrating an example of a timing pattern of a periodically-alternated superimposition according to the embodiment.

FIG. 8 illustrates an example of the FSK superimposition timing pattern for the periodic and alternate superimposition. In FIG. 8, it is assumed that information to be superimposed as an FSK signal to the main signal light is a light label. Further, a period in which the light label is superimposed is depicted by "with label (w/ label)" and a period in which the light label is not superimposed is depicted by "without label (w/o label)".

For example, in the optical transmitter 10 illustrated in FIG. 3, the DSP 11 that is an example of the drive signal generator may perform an on-off control on an operation of the phase rotation controller 111. Thereby, the optical transmitter 10 is possible to create the "w/ label" periods and the "w/o label" periods according to the on-off control.

In other words, the DSP 11 is available to generate a drive signal to which a light label is selectively (or intermittently) superimposed, according to a predetermined superimposition pattern including a period in which a light label (that is an example of a second signal) is superimposed to a main signal (that is an example of a first signal) and a period in which the light label is not superimposed to the main signal.

For example, when the reception side starts a detection of an FSK superimposition timing pattern during a "w/o label" period, the reception side is available to detect one cycle of the FSK superimposition timing pattern by detecting both of "w/ label" and "w/o label" periods subsequent to the "w/o label" period. Thus, the reception side is possible to detect an FSK signal during the "w/ label" period and to measure an OSNR during the "w/o label" period according to the detected cycle.

Whether a period is the "w/ label" period or the "w/o label" period may be identified by detecting (or monitoring) whether or not an ASK signal component appears in optical power passing through the OBPF and detected by the PD, for example.

For example, during the "w/ label" period, an ASK signal component corresponding to an FSK modulation appears in output light of the PD. Meanwhile, during the "w/o label" period, an ASK signal component does not substantially appear in output light of the PD. Thus, whether or not a light label is superimposed can be detected without actually receiving and detecting a light label. However, by actually receiving and detecting a light label as described below, it is also possible to identify whether or not a light label is superimposed.

The "w/ label" period and the "w/o label" period may have the same duration or may have different durations. For example, by setting the "w/o label" period with a longer duration than that of the "w/ label" period, a period used to detect an optical power for a measurement of an OSNR may be made relatively long to improve a measurement accuracy of the OSNR.

In this case, the "w/ label" period may be set with the shortest duration as long as a light label can be detected. For example, as long as a light label can be detected, a ratio of the "w/ label" period and the "w/o label" period may be set with "1:9".

By contrast with the above, the "w/ label" period may be set with a longer duration than that of the "w/o label" period to improve a detection accuracy of light label.

Further, the reception side may perform and complete a measurement of an OSNR during a single "w/o label" period, or may perform a measurement of an OSNR during a plurality of "w/o label" periods interposed one or more of "w/ label" periods therebetween.

According to the method of measuring an OSNR illustrated in FIG. 4, a center transmittance frequency of the OBPF may be set to the center frequency $f_{CF}$ of the main signal light during a first "w/o label" period, and then set to the offset frequency $f_{OF}$ during a second "w/o label" period.

Configuration Example of Optical Receiver

Figure 9:
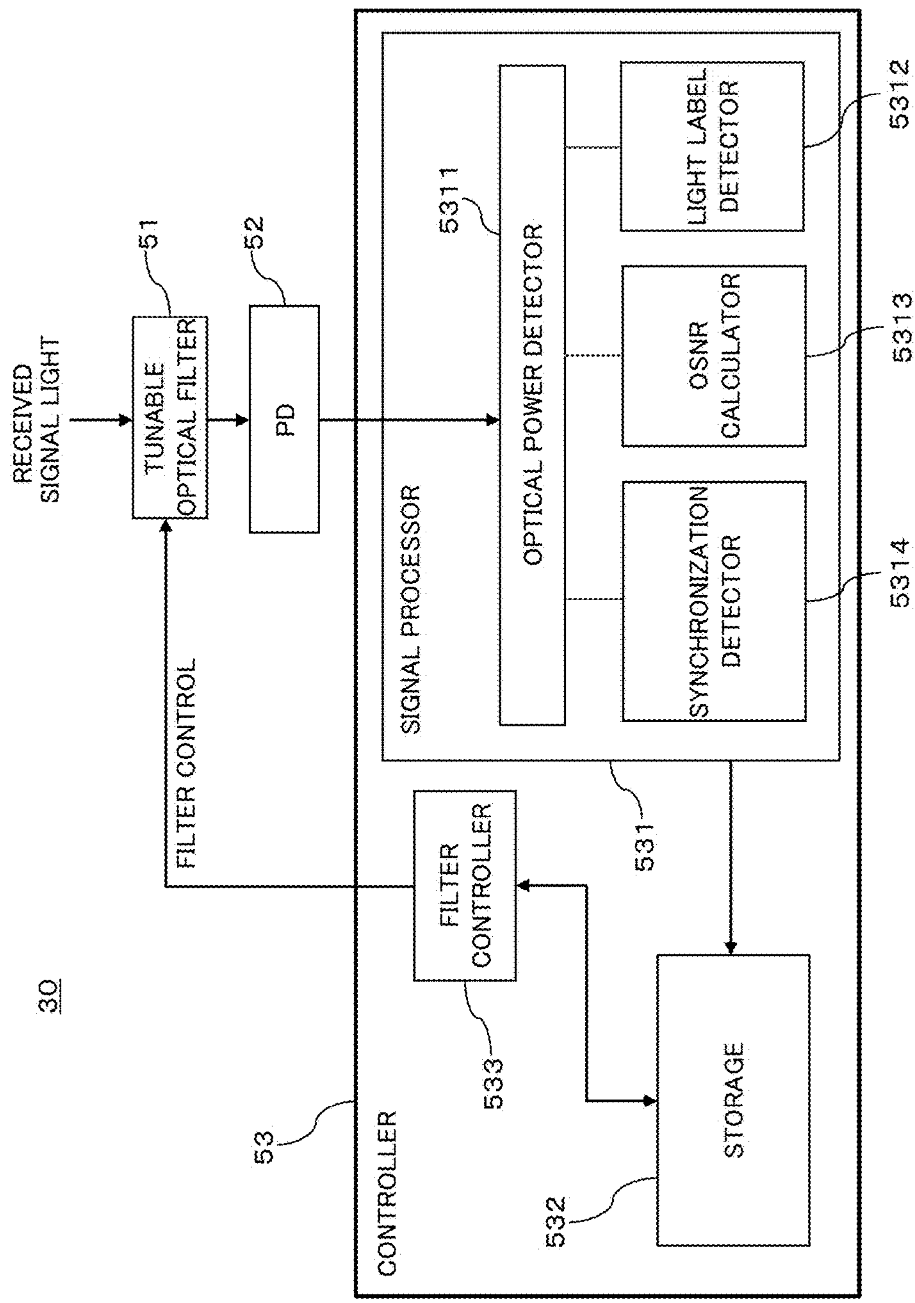
FIG. 9 is a block diagram illustrating a configuration example of the optical receiver according to the embodiment.

FIG. 9 illustrates a configuration example of the optical receiver 30 which is available to selectively perform a detection of an FSK signal and a measurement of an OSNR as described above. The optical receiver 30 illustrated in FIG. 9 may include, for example, a tunable optical filter 51, a PD (a photodetector or a photodiode) 52 and a controller 53.

The tunable optical filter 51 may be considered as corresponding to the tunable OBPF 31 illustrated in FIG. 3. The tunable optical filter may receive an input of signal light received from the optical transmission line.

The PD 52 may be considered as corresponding to the PD 32 illustrated in FIG. 3. The PD 52 may receive light having passed through the tunable optical filter 51 to convert the light into an electrical signal corresponding to a received optical power of the light. The electrical signal output by the PD 52 may be a current signal or a voltage signal obtained by converting the current signal by a transimpedance amplifier (TIA) or the like.

The controller 53 may detect an FSK signal (e.g. a light label) superimposed to the main signal light and measure an OSNR based on the electrical signal output by the PD 52. Further, the controller 53 may control the center transmittance frequency of the tunable optical filter 51 according to a detected FSK superimposition timing pattern.

Hence, the controller 53 may include, for example, a signal processor 531, a storage 532 and a filter controller 533. The signal processor 531 may include, for example, an optical power detector 5311, a light label detector 5312, an OSNR calculator 5313 and a synchronization detector 5314.

In the signal processor 531, the optical power detector 5311 may detect a power of light received by the PD 52 based on the output signal of the PD 52.

The light label detector 5312 is an example of a superimposed signal detector, and may detect a light label superimposed to the main signal light, based on the power detected by the optical power detector 5311. The light label detector 5312 may be considered as corresponding to the path ID detector 33 illustrated in FIG. 3.

The OSNR calculator 5313 may calculate an OSNR of the main signal light by using the aforementioned Mathematical Formulae 2 to 5 based on the power detected by the optical power detector 5311.

The synchronization detector 5314 may detect an FSK superimposition timing pattern based on the power detected by the optical power detector 5311 to identify the "w/ label" period and the "w/o label" period and to detect a synchronization timing for each period.

The storage 532 may store data or information obtained by a signal process in the signal processor 531. The data or the information stored in the storage 532 may include a detection result of each of the detectors 5312 to 5314. A flash memory, a hard disk drive (HDD) or a solid state drive (SSD) may be applied to the storage 532.

The filter controller 533 may control the center transmittance frequency of the tunable optical filter 51. The control of the center transmittance frequency may be referred to as a "control of transmittance characteristics" or a "control of filter characteristics" of the tunable optical filter 51.

The center transmittance frequency of the tunable optical filter 51 may be controlled according to the synchronization timing, which is detected by the synchronization detector 5314 and synchronized with the FSK superimposition timing pattern.

For example, during a "w/ label" period identified from the synchronization timing, the center transmittance frequency of the tunable optical filter 51 may be controlled, for a reception and a detection of the light label, to a frequency offset from the carrier frequency $f_{CF}$.

Meanwhile, during a "w/o label" period, the center transmittance frequency of the tunable optical filter 51 may be time-divisionally controlled, for a measurement of an OSNR, to the carrier frequency $f_{CF}$ of the main signal light and the offset frequency $f_{OF}$.

Operation Example

An operation example of the optical receiver 30 illustrated in FIG. 9 will be described below with reference to a flowchart illustrated in FIG. 10.

As illustrated in FIG. 10, the controller 53 may cause the filter controller 533 to set the center transmittance frequency of the tunable optical filter 51 to a frequency offset to a high frequency side (or may be a low frequency side) from the carrier frequency $f_{CF}$ of the main signal light (process P10).

The frequency may be the same as or different from the offset frequency $f_{OF}$ for a measurement of an OSNR as illustrated in (2) of FIG. 4. In other words, the center transmittance frequency of the tunable optical filter 51 may be set such that power fluctuations corresponding to a light label superimposed to the main signal light appears in the output light of the tunable optical filter 51.

In response to a filter control in process P10, light having passed through the tunable optical filter 51 is received by the PD52. An electrical signal having an amplitude component corresponding to a received optical power of the light may be input to the optical power detector 5311 of the signal processor 531, for example.

The optical power detector 5311 may detect a power corresponding to the amplitude component of the electrical signal input from the PD 52. The power detected by the optical power detector 5311 may be considered as being indicative of an optical power input to the PD 52.

In this regard, the power detected by the optical power detector 5311 fluctuates according to a light label during the "w/ label" period. Meanwhile, during the "w/o label" period, fluctuations corresponding to a light label does not substantially occur in the power detected by the optical power detector 5311.

Hence, the synchronization detector 5314 is available to identify the "w/ label" period and the "w/o label" period and to detect a synchronization timing of each period, based on whether or not power fluctuations are detected by the optical power detector 5311, for example (process P20).

In response to the detection of the synchronization timing (YES in process P30), the synchronization detector 5314 may identify a reception (or detection) period for a light label and a measurement period for an OSNR. For example, the reception period for a light label may be the "w/ label" period, and the measurement period for an OSNR may be the "w/o label" period. Data indicative of the identified period (such data may also be referred to as "timing data" for the purpose of description) may be stored in the storage 532, for example (process P40). The detection process of synchronization timing (P20) may be retried until the synchronization timing is detected successfully (NO in process P30).

The controller 53 may cause the filter controller 533 to control the center transmittance frequency of the tunable optical filter 51 to a frequency for a reception of light label during the reception period for light label, which is identified based on the timing data (process P50).

The frequency for a reception of light label may be a frequency offset from the carrier frequency $f_{CF}$, and may be the same as or different from the offset frequency $f_{OF}$ for a measurement of an OSNR as illustrated in (2) in FIG. 4 and as in process P10.

In response to the filter control in process P50, the light having passed through the tunable optical filter 51 is received by the PD 52. The electrical signal having an amplitude component corresponding to a received optical power of the light may be input to the optical power detector 5311 of the signal processor 531, for example.

During a "w/ label" period, since an optical power output by the PD 52 fluctuates in response to a light label and an ASK signal component appears, the light label detector 5312 can detect a light label based on the ASK signal component (process P60). The detected light label may be stored in the storage 532, for example.

In other words, the light label detector 5312 can detect a light label based on an output electrical signal of the PD 52 obtained in response to a control of the center transmittance frequency of the tunable optical filter during a period in which a light label is superimposed.

Subsequently, the controller 53 may cause the filter controller 533 to control the center transmittance frequency of the tunable optical filter 51 to a frequency for a measurement of an OSNR during the "w/o label" period identified based on the timing data stored in the storage 532 (process P70).

The frequency for the measurement of an OSNR may be the carrier frequency $f_{CF}$ and the offset frequency $f_{OF}$ as illustrated in (2) of FIG. 4. For example, the filter controller 533 may control the center transmittance frequency of the tunable optical filter 51 to the carrier frequency $f_{CF}$ and the offset frequency $f_{OF}$ in time-division.

The PD 52 time-divisionally receives lights having passed through the tunable optical filter 51 when the center transmittance frequency is time-divisionally controlled to the carrier frequency $f_{CF}$ and the offset frequency $f_{OF}$. Each electrical signal having an amplitude component corresponding to each of received optical powers of the lights may be input to the optical power detector 5311 of the signal processor 531, for example.

Thus, the optical power detector 5311 can detect the power $P_{CF}$ of a component of the carrier frequency $f_{CF}$ and the power $P_{OF}$ of a component of the offset frequency $f_{OF}$, which are expressed in Mathematical Formulae 3 and 4, for example.

The OSNR calculator 5313 calculates an OSNR based on the detected powers $P_{CF}$ and $P_{OF}$ by performing a calculation indicated by Mathematical Formula 2. The calculated OSNR may be stored in the storage 532, for example (process P80).

In other words, the OSNR calculator 5313 calculates the OSNR of the main signal light based on an output electrical signal of the PD 52 obtained in response to control of the center transmittance frequency of the tunable optical filter 51 during a period in which a light label is not superimposed.

Subsequently, the controller 53 determines whether or not the reception process of a light label and the measurement process of an OSNR are to be continued (process P90). Upon determining to continue the reception process and the measurement process (YES in process P90), the controller 53 may repeat processes P50 to P80. Meanwhile, upon determining not to continue the reception process and the measurement process (NO in process P90), the controller 53 may end the process.

Determining whether or not to continue the reception process and the measurement process may depend on a control signal from the NMS 3. For example, upon receiving from the NMS 3 a control signal indicating that the processes is to be continued, or upon not receiving a control signal indicating that the processes are to be stopped, the controller 53 may determine to continue the processes. Meanwhile, upon receiving a control signal indicating that the processes are to be stopped, the controller 53 may determine to stop the processes.

In an example depicted in FIG. 10, the measurement process of an OSNR (P70 and P80) is performed after the reception process of a light label (P50 and P60). However, a measurement process of an OSNR may be performed before a reception process of a light label.

As described above, according to the above embodiment, it is possible to selectively perform a reception of light label and a measurement of OSNR according to whether or not a light label is superimposed to the main signal light. Therefore, it is possible to improve both of a reliability of a reception (or detection) of light label and a measurement accuracy of OSNR.

Further, since the optical transmitter 10 sets a predetermined pattern indicating whether or not a light label is superimposed to the main signal light, the optical receiver 30 can easily detect the pattern of whether or not a light label is superimposed. Therefore, the optical receiver 30 is also easy to selectively control a reception of light label and a measurement of OSNR, based on the detected pattern.

For example, by setting a periodic and alternate superimposition pattern as illustrated in FIG. 8, when once the optical receiver 30 can detect at least one "w/ label" period and at least one "w/o label" period, the optical receiver 30 can identify an alternate superimposed cycle subsequent to the detected periods.

Hence, by alternately and selectively switching between the reception of light label and the measurement of OSNR according to the identified cycle, the optical receiver 30 is available to reliably perform the reception of light label and the measurement of OSNR.

Further, switching between the reception of light label and the measurement of OSNR can be performed by controlling the center transmittance frequency of a single tunable optical filter 51 based on the identified cycle.

In other words, the tunable optical filter 51 may be shared by both of the reception of light label and the measurement of OSNR. Therefore, the selective control of the reception of light label and the measurement of OSNR can be achieved with a simple configuration and a simple control.

Further, with a periodical and alternate superimposition of light labels, it is possible to reduce a time taken for a reception process of light label and a measurement process of OSNR in comparison with a case where a reception of light label or a measurement of OSNR is controlled by a control signal from the NMS 3 as described above.

For example, it is assumed that in the alternate superimposition pattern illustrated in FIG. 8, a band for which a light label is superimposed is 20 kHz (10 kb/s), and one frame of the light label is 256 bits (=25.6 ms).

Further, it is assumed that the number of frames used for a reception (or detection) of light label is 10 (=256 ms), and a "w/o label" period used for a measurement of OSNR is 140 ms to 210 ms (or may be the same as 256 ms of a time taken for a detection of light label).

Further, when it is assumed that the "w/ label" period and the "w/o label" period having the same duration are set to alternately appear, one cycle including one "w/ label" period and one "w/o label" period is 256*10*2=5120 bits.

In this regard, assuming that the optical receiver 30 takes at least 1.5 period (=5120×1.5=7680 bits) to establish a synchronization with a timing of the alternate superimposition pattern, 0.768 seconds would be taken to establish the synchronization with the timing.

This time duration is approximately 1/100 in comparison with 100 ms of a time taken to control a reception and a measurement for every 50 node and every 100 wavelength by using the above-described control signal. Therefore, it is possible to substantially reduce the time.

Accordingly, it is possible to easily satisfy a real time performance in a constant monitor for a failure or an error in an optical path.

Modified Example

In the above embodiment, as illustrated in FIG. 8, an example where an FSK signal (e.g. light label) is superimposed to the main signal light according to an FSK superimposition timing pattern with a periodic and alternate superimposition has been described.

However, an FSK signal does not need to be periodically superimposed to the main signal light, and superimposed periods and non-superimposed periods do not need to alternately appear. For example, a first FSK signal to be superimposed to the main signal may include information indicative of a start timing and an end timing of a superimposition for a second FSK signal to be superimposed to the main signal light after the superimposition of the first FSK signal (such information may be referred to as "timing information" for the purpose of description).

In an optical receiver 30, the filter controller 533 may set the center transmittance frequency of the tunable optical filter 51 to a frequency for a reception of light label. Thereby, a light label detector 5312 can detect the first FSK signal.

Based on the timing information included in the detected first FSK signal, the "w/ label" periods and the "w/o label" periods can be identified. By selectively controlling in time-division the center transmittance frequency of the tunable optical filter 51 to a frequency for a reception of light label and a frequency for a measurement of OSNR according to the identified period, it is possible to selectively perform a reception of light label and a measurement of OSNR in time-division similar to the above-described embodiment.

FIG. 11A illustrates a format example of one frame of an FSK signal. As illustrated in FIG. 11A, one frame of the FSK signal may include a preamble field, a payload field and a checksum field.

The payload field may be set with the above timing information. The timing information may be set to the payload field together with light label data.

The preamble field may be set with a predetermined pattern signal. For example, the light label detector 5312 detects the preamble to establish a frame synchronization of the FSK signal.

Further, the checksum field may be set with a checksum that is an example of an error detection code. For example, the light label detector 5312 may perform an error detection on information or data set in the payload field based on the checksum. A frame in which an error is detected may be discarded by the light label detector 5312.

Thus, it is possible to prevent a determination on whether or not a light label is superimposed from being identified based on an FSK signal with a low reliability. Accordingly, it is possible to prevent a measurement of OSNR from being erroneously performed during a "w/ label" period and prevent a reception and detection of light label from being erroneously performed during a "w/o label" period.

As illustrated in FIG. 11B, the payload field of the FSK signal may be set with information indicative of a start timing of superimposition and a cycle of the superimposition of the FSK signal (such information may be referred to as "synchronization information" for the purpose of description).

The optical receiver 30 is available to identify "w/ label" periods and "w/o label" periods subsequent to a period identified from a received FSK signal in which the synchronization information is set, based on the synchronization information set in the payload field of the FSK signal received and detected by the light label detector 5312.

By selectively controlling the center transmittance frequency of the tunable optical filter 51 to a frequency for a reception of light label and a frequency for a measurement of OSNR according to the identified periods in time-division, the optical receiver 30 can selectively perform a reception of light label and a measurement of OSNR in time-division similar to the above-described embodiment.

Alternatively, as illustrated in FIG. 11C, the payload field may be set with information on a length of a light label to be superimposed to the main signal light and a duration of a non-superimposed period of the light label (such a period may also be referred to as a "gap duration" for the purpose of description).

The optical receiver 30 is available to identify "w/ label" periods and "w/o label" periods subsequent to a period identified from a received FSK signal in which the synchronization information is set, based on the duration information set in the payload field of the FSK signal received and detected by the light label detector 5312.

By selectively controlling the center transmittance frequency of the tunable optical filter 51 to a frequency for a reception of light label and a frequency for a measurement of OSNR in time-division according to the identified periods, the optical receiver 30 can selectively perform a reception of light label and a measurement of OSNR in time-division similar to the above-described embodiment.

An FSK signal having any one of formats illustrated in FIGS. 11A to 11C may be input to the DSP 11 (e.g. phase rotation controller 111) in the optical transmitter 10 illustrated in FIG. 3. Thereby, the DSP 11 can generate a drive signal for the optical modulator 124, in which the FSK signal having any one of the formats illustrated in FIGS. 11A to 11C is superimposed to the main signal.

Further, even in each example depicted in FIGS. 11A to 11C, the payload field just have to be set with information available to identify a period in which a light label is superimposed and a gap duration. When one of the formats illustrated in FIGS. 11A to 11C is used, the light label detector 5312 can identify the period in which the light label is superimposed and the period in which the light label is not superimposed, based on the information set in the payload field of the detected FSK signal.

Therefore, in this case, the light label detector 5312 may be considered as having a function of the synchronization detector 5314. Accordingly, the above-described synchronization detector 5314 in the optical receiver 30 may be deleted, and thus, it is possible to simplify a configuration of the controller 53. Hence, it is possible to downsize the optical receiver 30 and reduce power consumption thereof.

OTHERS

In the above embodiment and the modified example, a signal to be superimposed to the main signal light is an FSK signal. However, a signal to be superimposed to the main signal light may be an ASK signal.

In case of the ASK signal, even when the center transmittance frequency of the tunable optical filter 51 is set to a carrier frequency or is offset, power fluctuations corresponding to the ASK signal occurs in an output of a PD 52. Therefore, it is possible to detect and identify a period in which the ASK signal is superimposed and a period in which the ASK signal is not superimposed.

Hence, a reception (or detection) of the ASK signal may be performed during the period in which the ASK signal is superimposed, and a measurement of OSNR may be performed during the period in which the ASK signal is not superimposed. A control of the center transmittance frequency of the tunable optical filter 51 for the measurement of OSNR may be the same as or similar to that in the above-described embodiment. Further, even in a case where the ASK signal is used for a superimposed signal, one of the formats illustrated in FIGS. 11A to 11C is applicable.

According to the above technique, even when a second signal is superimposed to a first signal, it is possible to achieve a reliable reception of the first signal and an accuracy in measuring an OSNR.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An optical communication system comprising:

an optical transmitter; and an optical receiver configured to receive signal light transmitted by the optical transmitter, wherein the optical transmitter includes:

a drive signal generator configured to generate a drive signal by selectively superimposing a second signal to a first signal to be transmitted, according to a predetermined superposition pattern, the superposition pattern including a superimposed period in which the second signal is superimposed and a non-superimposed period in which the second signal is not superimposed; and an optical modulator configured to modulate transmission light with the drive signal generated by the drive signal generator to generate the signal light, and wherein the optical receiver includes:

a tunable optical filter configured to allow a part of spectrum of the received signal light to pass through;

a photodetector configured to convert light having passed through the tunable optical filter into an electrical signal;

a filter controller configured to control a center transmittance frequency of the tunable optical filter in response to the superimposed period and the non-superimposed period of the second signal, the respective periods being identified based on the electrical signal;

a superimposed signal detector configured to detect the second signal based on the electrical signal obtained in response to the control of the center transmittance frequency of the tunable optical filter during the superimposed period; and an optical signal-to-noise ratio (OSNR) calculator configured to calculate an OSNR of the signal light based on the electrical signal obtained in response to the control of the center transmittance frequency of the tunable optical filter during the non-superimposed period.

2. An optical receiver comprising:

a tunable optical filter configured to receive signal light and allow a part of a spectrum of the signal light to pass through, the signal light being obtained by selectively superimposing a second signal to a first signal to be transmitted according to a predetermined superposition pattern, and the superposition pattern including a superimposed period in which the second signal is superimposed and a non-superimposed period in which the second signal is not superimposed;

a photodetector configured to convert light having passed through the tunable optical filter into an electrical signal;

a filter controller configured to control a center transmittance frequency of the tunable optical filter in response to the superimposed period and the non-superimposed period of the second signal, the respective periods being identified based on the electrical signal;

a superimposed signal detector configured to detect the second signal based on the electrical signal obtained in response to the control of the center transmittance frequency of the tunable optical filter during the superimposed period; and an optical signal-to-noise ratio (OSNR) calculator configured to calculate an OSNR of the signal light based on the electrical signal obtained in response to the control of the center transmittance frequency of the tunable optical filter during the non-superimposed period.

3. The optical receiver according to claim 2, further comprising a synchronization detector configured to detect a synchronization with a timing of the superimposition pattern based on power fluctuations of the electrical signal, wherein the filter controller controls the center transmittance frequency of the tunable optical filter in response to the superimposed period and the non-superimposed period based on the superimposed pattern identified by the synchronization detected by the synchronization detector.

4. The optical receiver according to claim 2, wherein the second signal is set with information available to identify the superimposition pattern, the superimposed signal detector detects the information available to identify the superimposition pattern by detecting the second signal, and the filter controller controls the center transmittance frequency of the tunable optical filter in response to the superimposed period and the non-superimposed period, based on the detected information available to identify the superimposition pattern.

5. The optical receiver according to claim 2, wherein the superimposition pattern is a pattern to periodically superimpose the second signal to the first signal.

6. The optical receiver according to claim 2, wherein the second signal is superimposed to the first signal with a frequency shift keying or an amplitude shift keying.

7. An optical transmitter comprising:

a drive signal generator configured to generate a drive signal by selectively superimposing first superimpose signal and second superimpose signal to a first signal to be transmitted, according to a predetermined superimposition pattern, the superimposition pattern including a superimposed period in which the first superimpose signal and the second superimpose signal is superimposed and a non-superimposed period in which the both of the first superimpose signal and second superimpose signal are not superimposed; and an optical modulator configured to modulate transmission light with the drive signal generated by the drive signal generator to generate the signal light, the first superimpose signal further including timing information representing a start timing and an end timing of a superimposition for the second superimpose signal on the first signal after the first superimpose signal is superimposed on the first signal.

8. The optical transmitter according to claim 7, wherein the superimposition pattern is a pattern to periodically superimpose the first superimpose signal and the second superimpose signal to the first signal.

9. The optical transmitter according to claim 7, wherein the drive signal generator sets information available to identify the superimposition pattern to the first superimpose signal.

10. The optical transmitter according to claim 7, wherein the drive signal generator superimposes the first superimpose signal and the second superimpose signal to the first signal with a frequency shift keying or an amplitude shift keying.

* * * * *